United States Patent [19]
Goodell

[11] Patent Number: 4,481,846
[45] Date of Patent: Nov. 13, 1984

[54] OVERHEAD FENCE ASSEMBLY

[76] Inventor: Chester E. Goodell, 1380 Zephyr Way, Sparks, Nev. 89431

[21] Appl. No.: 352,934

[22] Filed: Feb. 26, 1982

[51] Int. Cl.[3] ........................ B26D 7/06; B23D 33/02; B27C 1/12; B32Q 3/00

[52] U.S. Cl. ........................ 83/438; 83/477.2; 144/253 R; 269/315

[58] Field of Search .............. 83/438, 446, 468, 477.2, 83/467; 144/253 R; 269/303, 304, 315, 318

[56] References Cited

U.S. PATENT DOCUMENTS

| | | | |
|---|---|---|---|
| 1,504,248 | 8/1924 | Johnson | 83/477.2 |
| 1,566,225 | 12/1925 | Mills | 269/315 |
| 2,520,837 | 8/1950 | Hammond | 144/253 R |
| 3,092,157 | 6/1963 | Lasar | 83/438 |
| 3,348,591 | 10/1967 | Carrasco | 83/467 |
| 4,206,910 | 6/1980 | Biesemeyer | 144/253 R |

*Primary Examiner*—Robert L. Spruill
*Assistant Examiner*—Paul M. Heyrana
*Attorney, Agent, or Firm*—Leonard Bloom

[57] ABSTRACT

An overhead guide for a power saw provided with a vertically adjustable overhead fence guide which can engage the work product directly or a template affixed to the upper surface of the work product. The device clamps to a conventional power saw fence and can be rotated away from the work area to allow direct use of the conventional fence itself.

16 Claims, 2 Drawing Figures

OVERHEAD FENCE ASSEMBLY

BACKGROUND OF THE INVENTION

The present invention relates generally to a fence assembly used in conjunction with a power saw which guides the stock through the saw.

When passing a piece of work through a tablesaw it is necessary that the stock be properly guided to ensure an accurate and straight cut. Most tablesaws are provided with an adjustable fence to guide the work through the saw. The present invention is designed to be used in conjunction with a conventional fence on a tablesaw so that work may be more accurately and safely guided through the saw.

The broad concept of an adjustable saw fence for a tablesaw is well known in the prior art. The following patents reflect the state of the art of which applicant is aware insofar as the appear to be germane to the patent process: U.S. Pat. Nos. 2,435,382 Caskey, 3,348,591 Carrasco, 2,764,190 Howard, 3,392,761 Klein, 3,192,814 Zimmerman, 4,002,329 Petrowski.

Of the references cited it would appear that the patent to Carrasco is significant since he teaches the use of a saw guide assembly in which a channel portion 7 is adapted to overlie a guide strip 3, and remain fastened thereto by means of a clamp 18, 20 (FIG. 2). In addition, the plate 9 is adapted to swing, as shown in that figure about hinge 12 to facilitate deployment of the device. The instant invention is distinguished from this and the remaining references in that it is capable of vertical adjustment so that the fence member can engage the work itself or be guided by a template affixed to the top of the work which guides the saw blade as the work passes through the saw. Furthermore, the instant invention is hinged so that the fence can be swung out of the way and the conventional tablesaw fence employed instead.

OBJECTS AND SUMMARY OF THE INVENTION

It is a primary object of the present invention to provide a novel overhead fence assembly to be used with a powered table saw which is vertically adjustable so that it can guide the work through the saw directly by engagement therewith, or be used in conjunction with a template affixed to a top surface of the work product.

Another object of this invention is to provide a novel overhead fence assembly to be used in conjunction with a power saw which is hinged so that it can be folded up away from the saw blade area when not in use.

A further object of this invention is to provide a novel overhead fence assembly for use in conjunction with a power saw which can be adjusted for either left or righthanded use by simply reversing the fence to the other side of the blade.

Still another object of this invention is to provide a novel overhead fence assembly for use in conjunction with a power saw which minimizes scrap and waste and maximizes the usage of material that is truer to dimension by allowing a carpenter to effectively trim bowed, crowned, or crooked shaped wood that would formerly be scrapped.

A still further object of the present invention is to provide a novel overhead fence assembly for use with a power saw which also acts as a guard against the power saw blade because the saw cuts just underneath the fence support edge in an unexposed position.

The objects stated above and other related objects are accomplished by the provision of a vertically adjustable saw fence which can guide the work product directly through the saw or engage a template fixed to a top surface of the work product which allows crooked stock to be adequately trimmed and dimensioned for use as a component. Two hinged brackets adjustably deployed on a conventional fence are used in conjunction with two threaded shafts which allow the fence support to be vertically adjusted in relation to the work product.

Still further objects and advantages of the present invention will become apparent from the following description when taken in conjunction with the accompanying drawing figures.

DESCRIPTION OF THE DRAWING FIGURES

DESCRIPTION OF THE PREFERRED EMBODIMENT

Figure 1:
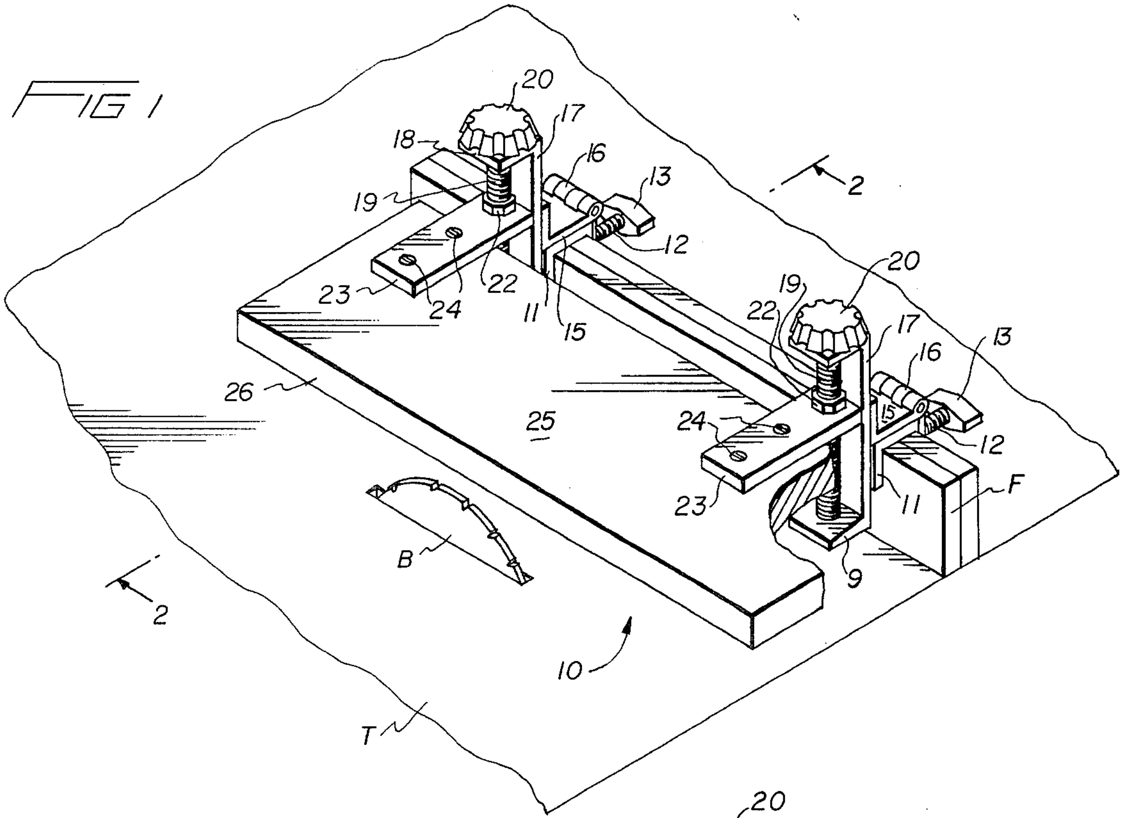
FIG. 1 is a perspective view of the instant apparatus as it would be applied to a conventional type tablesaw.

Referring now the drawings in detail wherein like reference numerals represent like parts throughout the several figures, reference numeral 10 in FIG. 1 refers generally to the device according to the instant application.

Figure 2:
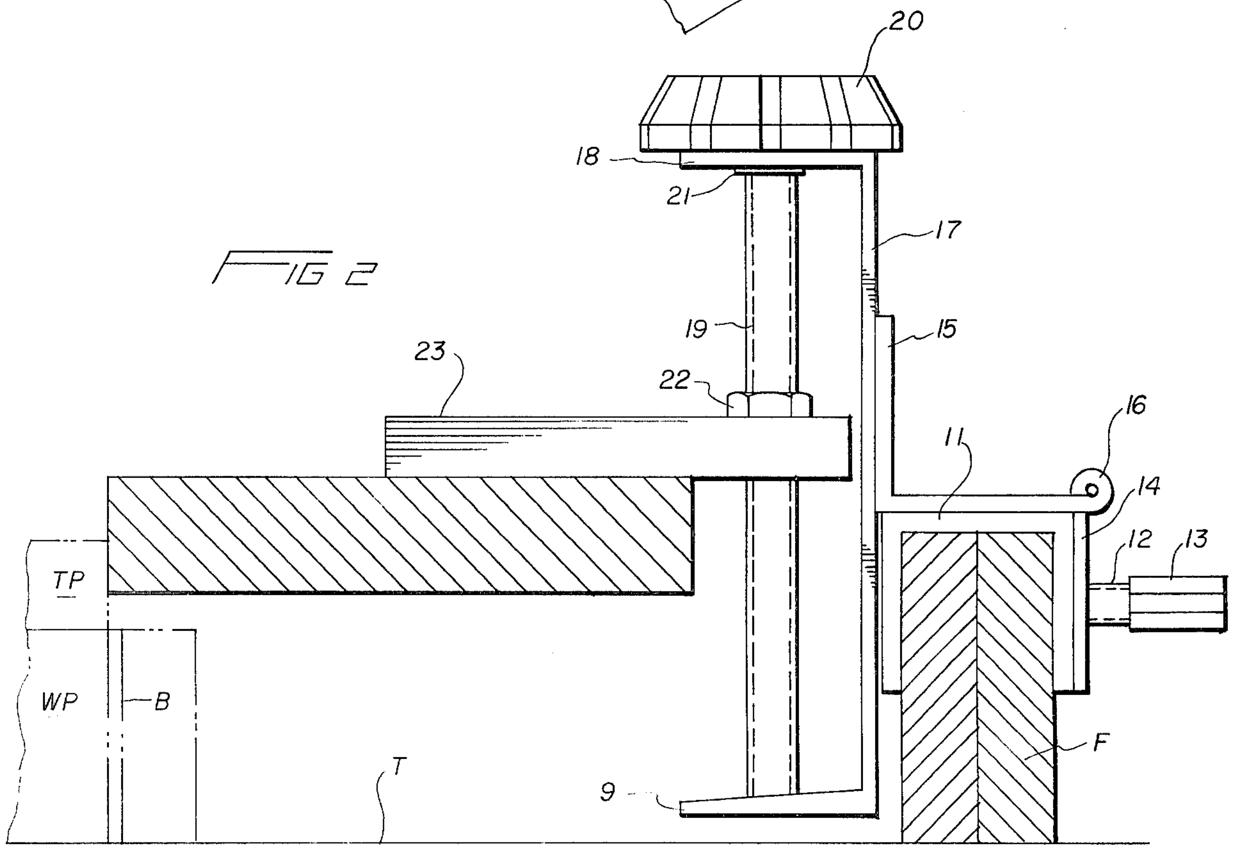
FIG. 2 is a sectional view taken along lines 2—2 of FIG. 1.

In FIG. 1, T is a flat table of a conventional tablesaw, B is a blade that extends through the table T, and F is a conventional type tablesaw fence. The overhead fence device 10 is affixed to the conventional fence F by two U-shaped brackets 11 and two threaded rods 12 with two handles 13 which clamp the device 10 to the fence F by being threaded through the brackets 11 and engaging the fence F. The rods 12 also engage and support two lower hinge pieces 14 (FIG. 2) which are connected to two L-shaped upper hinge pieces 15 by means of two hinges 16. The upper hinge pieces 15 are affixed to and support elongate C-shaped metal brackets 17 that have an upper tang 18 and a lower tang 9. Two vertically disposed, threaded adjustment rods 19 with large adjustment handles 20 affixed to the upper extremity of the adjustment rods 19 are supported by the upper tangs 18 and held in place by two stop washers 21. The adjustment rods 19 pass through two nuts 22 which are affixed to two horizontally disposed support bars 23 so that turning the handles 20 causes the support bars 23 to raise or lower upon the adjustment rod 19.

The support bars 23 each have two apertures 24 which are used to mount the wooden overhead fence guide 25. The overhead fence guide 25 has a leading edge 26 which actually engages the work product or the template affixed to the top of the work product.

In use and operation, the overhead fence guide 25 can be vertically adjusted in relationship to the table T by rotating the adjustment knobs 20. Thus, the leading edge 26 of the overhead fence guide 25 can be adjusted to engage the work product of FIG. 2 directly or a template TP FIG. 2 affixed to the top of the work product WP. This ensures a more straight cut because the straight leading edge 26 of the overhead fence guide 25 engages the straight edge of the template TP thereby directing the saw blade B in a straight linear path. The conventional fence F can also be used directly by rotating the entire device 10 about the hinges 16 so that it flips out of the way allowing the fence F to be used directly. Furthermore, the device 10 can be reversed on the fence F thereby adjusting to guide the work product from either the left or righthand side.

Having thus described the preferred embodiment of the invention, it should be understood that numerous structural modifications and adaptations may be resorted to without departing from the spirit of the invention.

What is claimed is:

1. An overhead fence guide for a table having a saw or the like comprising in combination:

clamping means connecting said guide to a fence on the saw table, and means for vertically elevating from one horizontal elevation to another said guide relative to the table whereby a workpiece can operatively engage an edge of said guide and said guide can be vertically reoriented to accommodate diverse workpieces, and including hinge means between said guide and said clamping means, whereby said guide can be rotated in an arc about said hinge means into an inoperative position, wherein said vertically elevating means comprises, a bracket attached to said hinge means, a threaded rod supported in said bracket, and a support bar fastened on said guide and threaded to said threaded rod, whereby rotation of said threaded rod vertically moves said support bar and therefore said guide from one horizontal elevation to another.

2. The device of claim 1 wherein said threaded rod includes handle means on an extremity thereof for rod rotation and therefore guide motion.

3. The device of claim 2, wherein said bracket is substantially C-shaped and has horizontal tangs, said threaded rod extending between said tangs.

4. The device of claim 3, wherein said supporting bar has a nut affixed thereto threaded on said threaded rod.

5. The device of claim 4, including a stop washer on said threaded rod to constrain said threaded rod in said bracket.

6. The device of claim 5, wherein said clamp means is defined by an inverted substantially U-shaped bracket overlying the fence, and a further threaded rod extending through said U-shaped bracket in clamping engagement with the fence.

7. The device of claim 6, wherein said hinge means includes an L-shaped upper piece, having a vertical leg affixed to said C-shaped bracket, a horizontal leg overlying a top face of the fence, a hinge connected to said horizontal leg remote from said vertical leg, a lower piece affixed to said U-shaped bracket and connected at said hinge to said upper piece whereby said hinge is on a side of the fence remote from the saw for clearance when said device is rotated into an inoperative position.

8. The device of claim 7, wherein a pair of hinge means, clamping means, and vertical elevating means are provided for stability.

9. The device of claim 8, wherein the saw is a rotary saw extending through a slit in the table in fixed relation thereto, the fence being provided parallel to and spaced from a face of the rotary saw.

10. A work guide attachment for placement on a fence of a table saw which has a circular saw extending through a slit in the saw table fixed for cutting in the slit, and the fence runs parallel to the circular saw, comprising in combination:

hinge means connecting said attachment to an edge of the fence remote from the circular saw for rotating the attachment away from the saw to remove said attachment from the saw and a side of the fence and work area adjacent the saw, and means for altering the horizontal elevation of said attachment disposed between the fence and the saw when said attachment is rotated adjacent the saw so that said work guide attachment can be oriented to different horizontal elevations and therefor accomodate different size workpieces and templates associated with the workpieces, wherein said altering means comprises, a bracket attached to said hinge means, a threaded rod supported in said bracket, and a support bar fastened on said guide and threaded to said threaded rod, whereby rotation of said threaded rod vertically moves said support bar and therefore said guide from one horizontal elevation to another.

11. A means having a saw fence and a saw for uniformly altering the distance between a table saw surface and an associated work guide comprising in combination:

attachment means connecting said guide to the fence, vertical elevation means between said attachment means and said guide to elevate the guide from one horizontal elevation to anther relative to the table saw surface, and hinge means parallel to the cutting direction of the saw connecting said elevation means to said attachment means to move said guide from an operative to an inoperative position, wherein said vertically elevating means comprises, a bracket attached to said hinge means, a threaded rod supported in said bracket, and a support bar fastened on said guide and threaded to said threaded rod, whereby rotation of said threaded rod vertically moves said support bar and therefore said guide from one horizontal elevation to another.

12. The device of claim 10, wherein said threaded rod includes handle means on an extremity thereof for rod rotation and therefore guide motion.

13. The device of claim 11, wherein said threaded rod includes handle means on an extremity thereof for rod rotation and therefore guide motion.

14. The device of claim 11, wherein said clamp means is defined by an inverted substantially U-shaped bracket overlying the fence, and a further threaded rod extending through said U-shaped bracket in clamping engagement with the fence wherein said hinge means includes an L-shaped upper piece, having a vertical leg affixed to said C-shaped bracket, a horizontal leg overlying a top face of the fence, a hinge connected to said horizontal leg remote from said vertical leg, a lower piece affixed to said U-shaped bracket and connected at said hinge area to said upper piece whereby said hinge is on a side of the fence remote from the saw for clearance when said device is rotated into an inoperative position.

15. The device of claim 12, wherein said clamp means is defined by an inverted substantially U-shaped bracket overlying the fence, and a further threaded rod extending through said U-shaped bracket in clamping engagement with the fence wherein said hinge means includes an L-shaped upper piece, having a vertical leg affixed to said C-shaped bracket, a horizontal leg overlying a top face of the fence, a hinge connected to said horizontal leg remote from said vertical leg, a lower piece affixed to said U-shaped bracket and connected at said hinge area to said upper piece whereby said hinge is on a side of the fence remote from the saw for clearance when said device is rotated into an inoperative position.

16. In a table saw of the type having a table, a saw blade extending upwardly through an opening in the table, and a fence on the table laterally of the blade, the improvement which comprises an overhead fence assembly including a guide member extending above the table and substantially covering the blade for improved safety, the guide member having a side leading edge, whereby a template carried on top of a workpiece engages the side leading edge of the guide member as the workpiece is pushed through the saw blade, whereby the workpiece substantially duplicates the template, means for vertically adjusting the position of the guide member relative to the table, and means for hingedly mounting the guide member on the fence, whereby the guide member is adapted to swing away from the blade to facilitate the cleaning of the cut scraps off the table.

* * * * *